United States Patent
Justak

(10) Patent No.: US 6,428,009 B2
(45) Date of Patent: Aug. 6, 2002

(54) ROBUST HYDRODYNAMIC BRUSH SEAL

(76) Inventor: John F. Justak, 50 Kindred St., Stuart, FL (US) 34994

( * ) Notice: Subject to any disclaimer, the term of this patent is extended or adjusted under 35 U.S.C. 154(b) by 0 days.

(21) Appl. No.: 09/819,585

(22) Filed: Mar. 28, 2001

Related U.S. Application Data

(60) Provisional application No. 60/195,249, filed on Apr. 3, 2000.

(51) Int. Cl.⁷ ................................................. F16J 15/44
(52) U.S. Cl. ....................................... 277/355; 277/411
(58) Field of Search ................................. 277/355, 411

(56) References Cited

U.S. PATENT DOCUMENTS

| | | | |
|---|---|---|---|
| 3,917,150 A | * 11/1975 | Ferguson et al. | 228/159 |
| 4,600,202 A | 7/1986 | Schaeffler et al. | |
| 5,026,252 A | 6/1991 | Hoffelner | |
| 5,181,728 A | * 1/1993 | Stec | 277/355 |
| 5,183,197 A | 2/1993 | Howe | |
| 5,755,445 A | 5/1998 | Arora | 277/53 |
| 5,799,952 A | * 9/1998 | Morrison et al. | 277/355 |
| 5,944,320 A | 8/1999 | Werner et al. | |
| 5,997,004 A | 12/1999 | Braun et al. | |
| 6,079,714 A | * 6/2000 | Kemslet | 277/303 |

FOREIGN PATENT DOCUMENTS

| | | |
|---|---|---|
| DE | WO 01/48887 A2 | 7/2001 |
| EP | 0 778431 A1 | 6/1997 |
| JP | 4-347066 | * 12/1992 |

* cited by examiner

*Primary Examiner*—Anthony Knight
*Assistant Examiner*—Alison K. Pickard
(74) *Attorney, Agent, or Firm*—Holland & Knight LLP

(57) ABSTRACT

A brush seal for sealing a circumferential gap between two relatively rotating machine components, e.g. the rotor or shaft and stator of a fluid flow machine, such as a gas turbine engine. One end of a plurality of seal bristles is fixed in an annular shape and are mounted to the stator, and their opposite ends are attached to a number of individual shoes located at the rotor. The shoes function very similarly to that of a tilting pad bearing shoe. Prior to shaft rotation, the shoes are in contact with the rotor surface with preferably the leading edge of each shoe set to have less contact than the trailing edge of the shoe. As such, when the rotor begins to rotate, a hydrodynamic wedge is created which lifts the shoe slightly off the surface of the shaft allowing the shoe to effectively "float" over the shaft at a design gap.

12 Claims, 3 Drawing Sheets

ROBUST HYDRODYNAMIC BRUSH SEAL

This application claims priority under 35 U.S.C. §119(e) to U.S. Provisional Application Ser. No. 60/195,249 filed Apr. 3, 2002 for all commonly disclosed subject matter. U.S. Provisional Application Ser. No. 60/195,249 is expressly incorporated herein by reference in its entirety to form a part of the present disclosure.

FIELD OF THE INVENTION

This invention relates to seals for sealing a circumferential gap between two machine components that are relatively rotatable with respect to each other, and, more particularly, to a hybrid brush seal having a plurality of bristles that are mounted in a ring shape on a first machine component and that have bristle ends directed at sealing surface of the second, rotating machine component, whereby the bristle ends are titled at an angle in the circumferential direction in the annular plane of the bristles, primarily in the direction of shaft rotation. The bristle ends are kept from direct contact with the rotating machine component via one or more shoes which are designed such that as the shaft rotates a hydrodynamic film will separate the shoe from the shaft. The shoe(s) is attached to the bristle ends at discreet locations.

BACKGROUND OF THE INVENTION

Turbomachinery, such as gas turbine engines employed in aircraft, currently is dependent on either labyrinth (see FIGS. 1A–1E), brush (see FIGS. 2A and 2B) or carbon seals for critical applications. Labyrinth seals provide adequate sealing, however, they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, such as during a high-G maneuver, there is the potential for increases in engine vibration. Straight-thru labyrinth seals (FIG. 1A) are the most sensitive to clearance changes, with large clearances resulting in a carryover effect. Stepped labyrinth seals (FIGS. 1B and 1C) are very dependent on axial clearances, as well as radial clearances, which limits the number of teeth possible on each land. Pregrooved labyrinth seals (FIG. 1D) are dependent on both axial and radial clearances and must have an axial clearance less than twice the radial clearance to provide better leakage performance than stepped seals.

Other problems associated with labyrinth seals arise from heat generation due to knife edge to seal land rub, debris from hardcoated knife edges or seal lands beings carried through engine passages, and excessive engine vibration. When seal teeth rub against seal lands, it is possible to generate large amounts of heat. This heat may result in reduced material strength and may even cause destruction of the seal if heat conducted to the rotor causes further interference. It is possible to reduce heat generation using abradable seal lands, however, they must not be used in situations where rub debris will be carried by leakage air directly into critical areas such as bearing compartments or carbon seal rubbing contacts. This also holds true for hardcoats applied to knife edges to increase rub capability. Other difficulties with hardcoated knife edges include low cycle fatigue life debits, rub induced tooth-edge cracking, and the possibility of handling damage. Engine vibration is another factor to be considered when implementing labyrinth seals.

As mentioned previously, this vibration can be caused by improper maintenance of radial clearances. However, it can also be affected by the spacing of labyrinth seal teeth, which can produce harmonics and result in high vibratory stresses.

In comparison to labyrinth seals, brush seals can offer very low leakage rates. For example, flow past a single stage brush seal is approximately equal to a four knife edge labyrinth seal at the same clearance. Brush seals are also not as dependent on radial clearances as labyrinth seals. Leakage equivalent to approximately a 2 to 3 mil gap is relatively constant over a large range of wire-rotor interferences. However, with current technology, all brush seals will eventually wear to line on line contact at the point of greatest initial interference. Great care must be taken to insure that the brush seal backing plate does not contact the rotor under any circumstances. It is possible for severing of the rotor to occur from this type of contact. In addition, undue wire wear may result in flow increases up to 800% and factors such as changes in extreme interference, temperature and pressure loads, and rubbing speeds must be taken into account when determining seal life.

The design for common brush seals, as seen in FIGS. 2A and 2B, is usually an assembly of densely packed flexible wires sandwiched between two plates. The free ends of the wires protrude beyond the plates and contact a land or runner, with a small radial interference to form the seal. The wires are angled so that the free ends point in the same direction as the movement of the runner. Brush seals are sized to maintain a tight diametral fit throughout their useful life and to accommodate the greatest combination of axial movement of the brush relative to the rotor.

Brush seals may be used in a wide variety of applications. Although brush seal leakage generally decreases with exposure to repeated pressure loading, incorporating brush seals where extreme pressure loading occurs may cause a "blow over" condition resulting in permanent deformation of the seal wires. Brush seals have been used in sealing bearing compartments, however coke on the wires may result in accelerated wear and their leakage rate is higher than that of carbon seals.

One additional limitation of brush seals is that they are essentially unidirectional in operation, i.e., due to the angulation of the individual wires, such seals must be oriented in the direction of rotation of the moving element as depicted by the arrow in FIG. 2A. Rotation of the moving element or rotor in the opposite direction, against the angulation of the wires, can result in permanent damage and/or failure of the seal. In the particular application of the seals required in the engine of a V-22 Osprey aircraft, for example, it is noted that during the blade fold wing stow operation, the engine rotates in reverse at very low rpm's. This is required to align rotor blades when stowing wings. This procedure is performed for creating a smaller aircraft footprint onboard an aircraft carrier. Reverse rotation of the engine would damage or create failure of brush seals such as those depicted in FIGS. 2A and 2B.

One attempt to limit wear of brush seals is disclosed in U.S. Pat. No. 5,026,252 to Hoffelner in which a sliding ring is interposed between the bristle pack of the seal and the moving element or rotor to avoid direct contact therebetween. The bristle ends are received within a circumferential groove in the sliding ring and are allowed to freely float or move within such groove. Although bristle wear may be reduced in this design, it is believed that the seal created at the interface of the sliding ring and rotor is unsatisfactory.

Carbon seals are generally used to provide sealing of oil compartments and to protect oil systems from hot air and contamination. Their low leakage rates in comparison to labyrinth or brush seals are well-suited to this application, however they are very sensitive to pressure balances and tolerance stack-ups. Pressure gradients at all operating conditions and especially at low power and idle conditions must be taken into account when considering the use of carbon seals. Seals must be designed to have a sufficiently thick seal plate and the axial stack load path must pass through the plate as straight as possible to prevent coning of the seal. Another consideration with carbon seals is the potential for seepage, weepage or trapped oil. Provisions must be made to eliminate these conditions which may result in oil fire, rotor vibration, and severe corrosion According to the Advanced Subsonic Technology Initiative as presented at the NASA Lewis Research Center Seals Workshop, development of advanced sealing techniques to replace the current seal technologies described above will provide high returns on technology investments. These returns include reducing direct operating costs by up to 5%, reducing engine fuel burn up to 10%, reducing engine oxides of emission by over 50%, and reducing noise by 7 dB. For example, spending only a fraction of the costs needed to redesign and re-qualify complete compressor or turbine components on advanced seal development can achieve comparable performance improvements. In fact, engine studies have shown that by applying advanced seals techniques to just a few locations can result in reduction of 2.5% in SFC.

SUMMARY OF THE INVENTION

It is therefore among the objectives of this invention to provide a hybrid brush seal for sealing a circumferential gap between two relatively rotating machine components such as a rotor and a stator which exhibits low wear rates, which provides low leakage, which has low dependence on clearances between the rotor and stator to retain acceptable sealing characteristics and which has a low contamination potential.

These objectives are accomplished in a hybrid brush seal according to this invention which comprises a number of individual seal bristles each affixed at an outer end to the stationary machine component or stator in an annular shape corresponding to the circumferential gap between the stator and the rotating component or rotor. The opposite, inner end of the seal bristles engage one or more shoes located with respect to the rotor to create a seal therebetween while avoiding contact of the seal bristles with the rotor.

This invention is predicated upon the concept of employing some of the advantages of conventional brush seals in an improved, hybrid brush seal which overcomes typical brush seal limitations of wear and unidirectional operation. In the presently preferred embodiment, each of the shoes is connected at discrete points to the abutting seal bristles such that the leading edge of the shoe is oriented to have less contact with the rotor than the trailing edge of the shoe. In one embodiment, each shoe is connected at two spaced locations to the abutting seal bristles by electron beam welding or similar mounting techniques, thus creating two hinge points for the shoe to translate about.

In operation, the shoe functions very similarly to that of a tilting pad bearing shoe. Prior to rotation of the rotor, the shoe is in contact with the rotor surface. Because the leading edge of the shoe has less contact with the rotor than its trailing edge, when the rotor begins to rotate a hydrodynamic wedge is created that lifts the shoe slightly off of the surface of the rotor. Consequently, the shoe "floats" over the rotor at a design gap, such as 0.0005 to 0.0010 inches.

The advantages of this hybrid brush seal are many. It will have the same sealing characteristics of existing brush seals, but will never change in performance due to bristle wear. The brush seal backing plate can be moved further outboard of the I.D. because the shoe will prevent the bristles from bending over in high pressure applications. Each shoe will be designed to have a certain amount of interference with the shaft prior to rotation. Thus, the seal can be slightly off center during assembly but once rotation begins, each pad will lift-off. Hence, tight tolerances can be relaxed.

The hybrid seal can be utilized in all seal applications, labyrinth, brush and carbon. The robust design will eliminate the careful handling now required of carbon seals utilized in lube system compartments. This seal may allow the engine designer to utilize less parts in the assembly as this seal will permit "blind" assemblies to occur.

The following table provides a comparison of the seal of the subject invention with currently available technology.

| Seal Type | Wear Rate | Leakage | Dependence on Clearances | Contamination Potential |
|---|---|---|---|---|
| Labyrinth Seals | High | Low | High | High |
| Brush Seals | Medium | Low | Medium | Medium |
| Carbon Seals | Medium | Very Low | High | Low |
| Hybrid Seal | Low | Low | Low | Low |

DESCRIPTION OF THE DRAWINGS

The structure, operation and advantages of this invention will become further apparent upon consideration of the following description, taken in conjunction with the accompanying drawings, wherein.

DETAILED DESCRIPTION OF THE PREFERRED EMBODIMENT

Figure 1A:
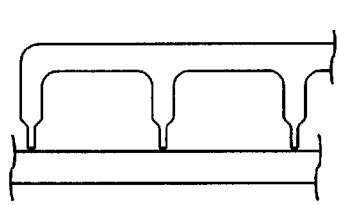
FIGS. 1A–1E are schematic views of a number of prior art labyrinth seals.
Figure 1B:
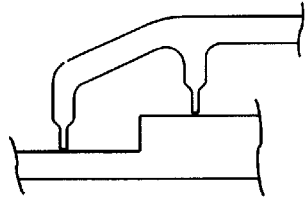
Figure 1C:
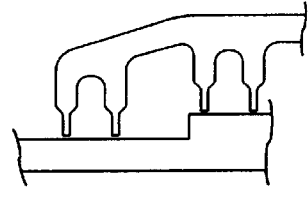
Figure 1D:
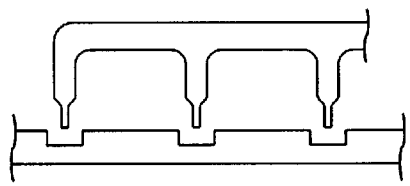
Figure 1E:
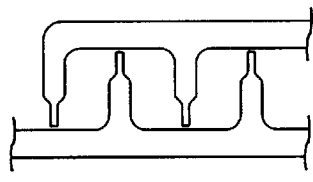
Figure 2A:
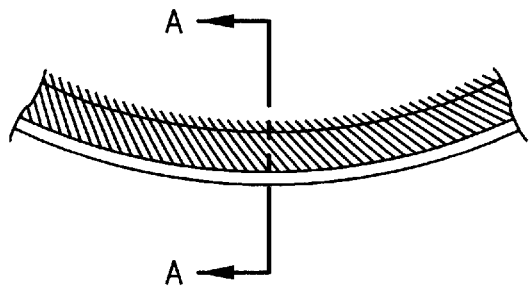
FIGS. 2A and 2B depict views of a prior art brush seal.
Figure 2B:
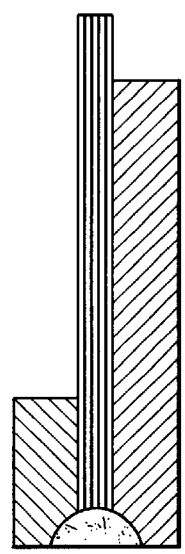
Figure 3:
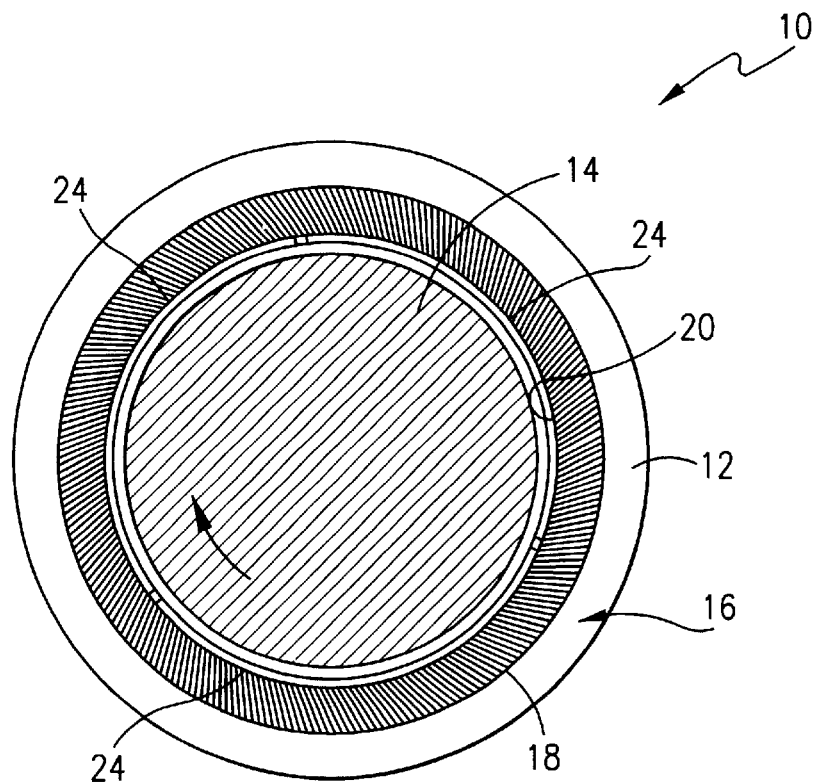
FIG. 3 is a cross sectional view of the hybrid brush seal of this invention.
Figure 4:
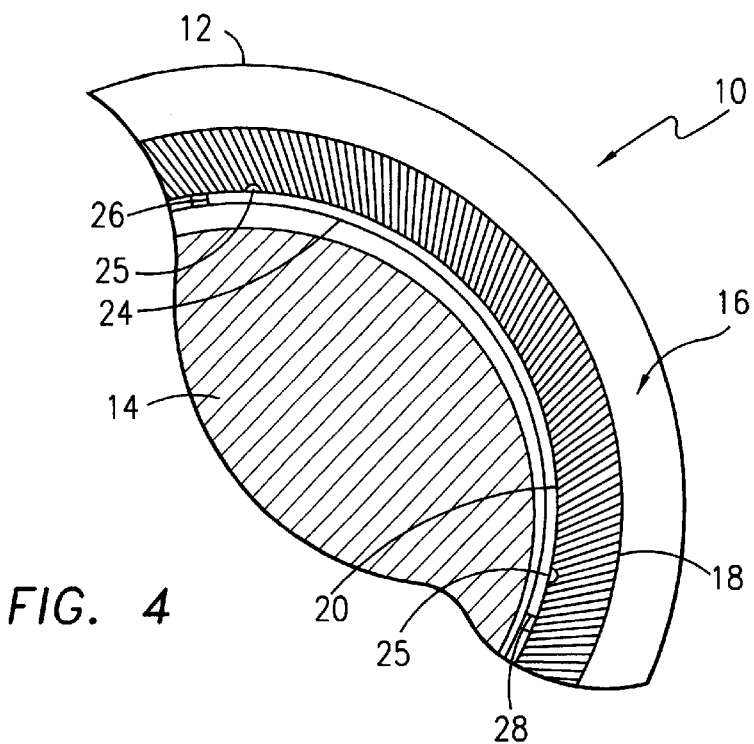
FIG. 4 is an enlarged view of a portion of the hybrid brush seal shown in FIG. 3.
Figure 5:
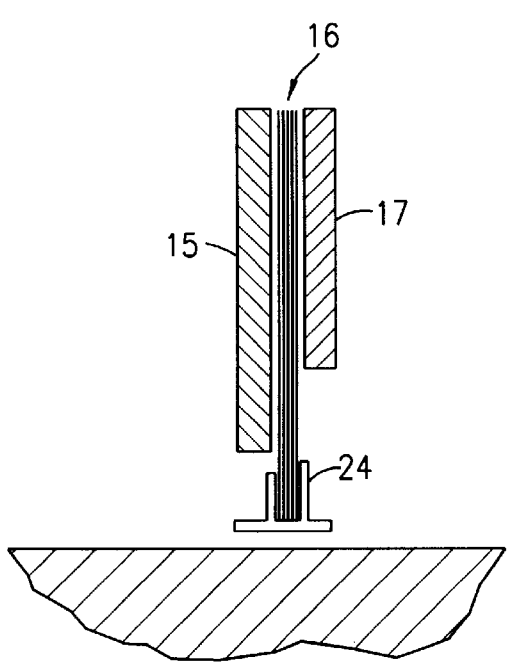
FIG. 5 is a schematic, elevational view of the seal shown in FIGS. 3 and 4.

Referring initially to FIGS. 3–5, the hybrid bush seal 10 of this invention is intended to create a seal between two relatively rotating components, namely, a fixed stator 12 and a rotating rotor 14. The seal 10 comprises a number of seal bristles 16 each having an outer end 18 mounted to the stator 12 and an inner end 20. The seal bristles 16 are preferably mounted to the stator 12 by clamping, welding, brazing or other means of affixation. The seal bristles 16 are arranged in an annular shape corresponding to the circumferential gap between the stator 12 and rotor 14. As beat seen in FIG. 5, the seal bristles 16 extend between a low pressure backing plate 15 and a high pressure backing plate 17 associated with the stator 12.

In one presently preferred embodiment, the seal bristles 16 are formed of a wire material, but it is contemplated that different materials may be utilized depending upon environmental conditions of the particular sealing application. In the past, brush seal materials, including the seal bristles, were chosen primarily on their high temperature and wear capability properties. The bristle seals 16 of this invention do not contact the rotor 14, as discussed below, and therefore different wear characteristics and other considerations are involved in the selection of appropriate materials for the bristle seals 16 as compared to conventional brush seals. The bristle seal 16 geometry may be angled in the direction of rotation of the rotor 14 as depicted in FIG. 3, or, alternatively, the bristle seals 16 may be straight of have varied angles. The diameter of each bristle seal 16 can be varied depending on the nature of the sealing environment. Additionally, the number of seal bristles 16 can be varied with the understanding that more bristles 16 generally leads to improved sealing.

The outer end 18 of the seal bristles abut one or more shoes 24 located in sealing relationship to the rotor 14. In the presently preferred embodiment, each shoe 24 is attached at discrete locations 25 to the abutting seal bristles 16, as illustrated in FIG. 4, such as by welding, brazing, clamping or other means. Preferably, the leading edge 26 of each shoe 24 has less contact with the rotor 14 than its trailing edge 28 so that a hydrodynamic wedge is created upon rotation of the rotor 14 which lifts the shoe 24 slightly away from the surface of the rotor 14 in an amount equal to the design gap between the rotor 14 and stator 12. The arc length, width, height, geometry and surface characteristics of the shoes 24 can be varied to enhance hydrodynamic pressure between the rotor 14 and stator 12, to vary the pressure sealing capabilities of the seal 10 and for other purposes.

FIG. 5 illustrates how a shoe 24 captures the bristle seals 16, and it is contemplated that the shoe 24 can be wider at the interface with rotor 14 to increase the hydrodynamic lift during operation. Preferably, the shoes 24 are made from sheet metal stampings or similar materials, to reduce manufacturing costs.

EXAMPLE

Considering the embodiment of the brush seal 10 of this invention depicted in FIGS. 3–5, in one example the seal shoe has a width of 0.10" and a length of 1.0" utilizing wire material of Haynes -25, a wire diameter of 0.0028", a wire free length of 0.5", a pack thickness of 0.07", a wire lay angle of 47°30' and a wire pack density of 2450 per circumferential inch. The load per wire can be calculated by modeling the single wire as a cantilevered beam. The resultant load per wire depends on the amount of deflection. Per wire the load can be between 0.0001 Lbf-0.00025 Lbf.

Thus, per inch of circumference the load could be as high as 0.6125 Lbf. The seal shoe with a width of 0.1' a length of 1.0' and typical pressure for hydrodynamic gas bearings are between 10–25 psi. is capable of lifting off between 1.0–2.5 Lbf. Of course the bristles will be slightly stiffer with the two hinge points and there will be some friction on the backing plate.

The seal design will be treated very much like a tilting pad bearing. At low rotational speeds, the pressure at the side boundaries of the bearing pad is essentially constant and equal to the ambient pressure, and at the pad leading and trailing edges there is a linear pressure gradient. At high journal surface speeds (●R) significant momentum changes occur at the pad leading edge ($\theta_{lk}$). Immediately upstream of the pad, the fluid entering the pad can develop a dynamic head equal to some fraction of a reference dynamic pressure based on the bearing surface speed (Burton and Carper, 1967, Smalley et al., 1974, Mori et al., 1991, Ettles et al., 1968), i.e.

$$\Delta P^k(Z, \theta_{lk}) = 1/2 K_p p^k \left(\frac{\bullet R}{2}\right)^2$$

The coefficient $K_p$ is an empirical ram pressure factor. Burton and Carper (1967) suggest a value of $K_p=0.64$ for high speed flows with large turbulence levels. The appearance of this ram pressure effect due to journal rotation at the leading edge of a bearing pad is of fundamental importance on the analysis of high speed tilting pad bearings. This equation is simply used as a means to show the importance of experimental/empirical validation.

The calculations from the computational model can only be as good as the assumptions used in the analysis. Measurements of forces and force coefficients for fixed-arc hybrid bearings with cryogens and surrogate fluids have appeared recently. The experimental work of Childs and Hale (1994) provides a wealth of test results and pointed out new directives for research and uses in the aerospace industry.

Figure 6:
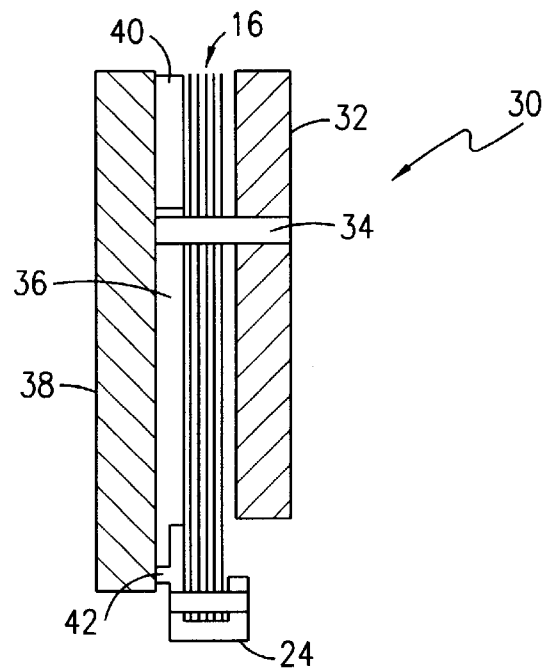
FIG. 6 is a schematic, elevational view of an alternative embodiment of the hybrid brush seal of this invention.

With reference now to FIG. 6, an alternative embodiment of a hybrid brush seal 30 according to this invention is shown. The seal 30 is essentially the same as the seal 10 shown in FIGS. 3–5, except for structure to prevent possible hysteresis within the seal 10. It is contemplated that in some circumstances in the operation of the seal 10 of FIGS. 3–5 that high pressure acting against the high pressure backing plate 17 could force the bristles 16 against the low pressure backing plate 15. Such force could cause the shoes 24 to fail to follow the dynamics of the rotor 14, thus creating seal-shoe hysteresis. The seal 30 of FIG. 6 is designed to eliminate this potential problem by including a high pressure backing plate 32 formed with a port 34 which extends into an orifice 36 on the low pressure side of the seal 30. This orifice 36 extends between a low pressure backing plate 38 and the bristles 16, and is formed by an outer ring 40 mounted to one end of the low pressure backing plate 38 and a small circumferentially extending extension 42 on the shoes 24 which engages the opposite end of the low pressure backing plate 36. At least some of the high pressure gas from the high pressure side of the seal 30 bleeds into the orifice 36 thus resisting movement of the bristles 16 against the low pressure backing plate 38 and substantially preventing the hysteresis effect noted above.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A brush seal for sealing a circumferential gap between a first machine component and a second machine component which is rotatable relative to the first machine component, comprising:

a number of seal bristles each having a first end and a second end, said first ends of said seal bristles being mounted to said first machine component and said second ends extending in a direction toward said second machine component;

at least one shoe extending about the second machine component, said at least one shoe being fixed to said second ends of said seal bristles in at least one location therealong to substantially prevent relative movement between said at least one shoe and said second ends and so that said seal bristles do not directly contact the second machine component.

2. The brush seal of claim 1 in which said at least one shoe comprises a number of individual shoes oriented end-to-end about the second machine component.

3. The brush seal of claim 2 in which each of said shoes is fixed at two discrete locations to said second ends of said seal bristles.

4. The brush seal of claim 3 in which said shoes are fixed to said second ends of said brush seals by welding.

5. The brush seal of claim 2 in which each of said shoes has a leading edge and a trailing edge, each of said shoes being fixed to said second ends of said brush seals so that said leading edge thereof is located further away from said second machine component than said trailing edge.

6. A brush seal for sealing a circumferential gap between a first machine component and a second machine component which is rotatable relative to the first machine component, comprising:

a number of seal bristles each having a first end and a second end, said first ends of said seal bristles being mounted to said first machine component and said second ends extending in a direction toward said second machine component;

a number of individual shoes oriented end-to-end about the second machine component with a space between adjacent shoes, each of said shoes having a leading edge and a trailing edge, each of said shoes being affixed at spaced locations to said second ends of said seal bristles so that said leading edge thereof is positioned further away from the second machine component than said trailing edge, said seal bristles being prevented by said shoes from directly contacting the second machine component.

7. A brush seal for sealing a circumferential gap between a first machine component and a second machine component which is rotatable relative to the first machine component, comprising:

a number of seal bristles each having a first end and a second end, said first ends of said seal bristles being mounted to said first machine component and said second ends extending in a direction toward said second machine component.

a low pressure backing plate spaced from a high pressure backing plate, said seal bristles extending within said space between said low pressure and high pressure backing plates, an orifice being formed between said low pressure backing plate and said seal bristles which is connected to a port formed in said high pressure backing plate;

at least one shoe extending about the second machine component, said at least one shoe being fixed to said second ends of said seal bristles in at least one location therealong to substantially prevent relative movement between said at least one shoe and said second ends and so that said seal bristles do not directly contact the second machine component.

8. The brush seal of claim 7 in which said orifice is formed by a ring mounted at one end of said low pressure backing plate which extends toward said bristle seals, and an extension protruding from said at least one shoe into contact with the other end of said low pressure backing plate.

9. The brush seal of claim 7 in which said at least one shoe comprises a number of individual shoes oriented end-to-end about the second machine component.

10. The brush seal of claim 9 in which each of said shoes is fixed at two discrete locations to said second ends of said seal bristles.

11. The brush seal of claim 10 in which said shoes are fixed to said second ends of said brush seals by welding.

12. The brush seal of claim 9 in which each of said shoes has a leading edge and a trailing edge, each of said shoes being fixed to said second ends of said brush seals so that said leading edge thereof is located further away from said second machine component than said trailing edge.

* * * * *